J. A. BAINES.
Metallic Planes.

No. 141,535.  Patented August 5, 1873.

WITNESSES:
Jas. E. Hutchinson
John R. Young

INVENTOR.
John A. Baines, by
Prindle and Co, his Attys

J. A. BAINES.
Metallic Planes.

No. 141,535.

6 Sheets--Sheet 2.

Patented August 5, 1873.

WITNESSES:
Jas. E. Hutchinson
John R. Young

INVENTOR.
John A. Baines, by
Prindle and Co, his Atty

J. A. BAINES.
Metallic Planes.
No. 141,535.
6 Sheets--Sheet 3.
Patented August 5, 1873.
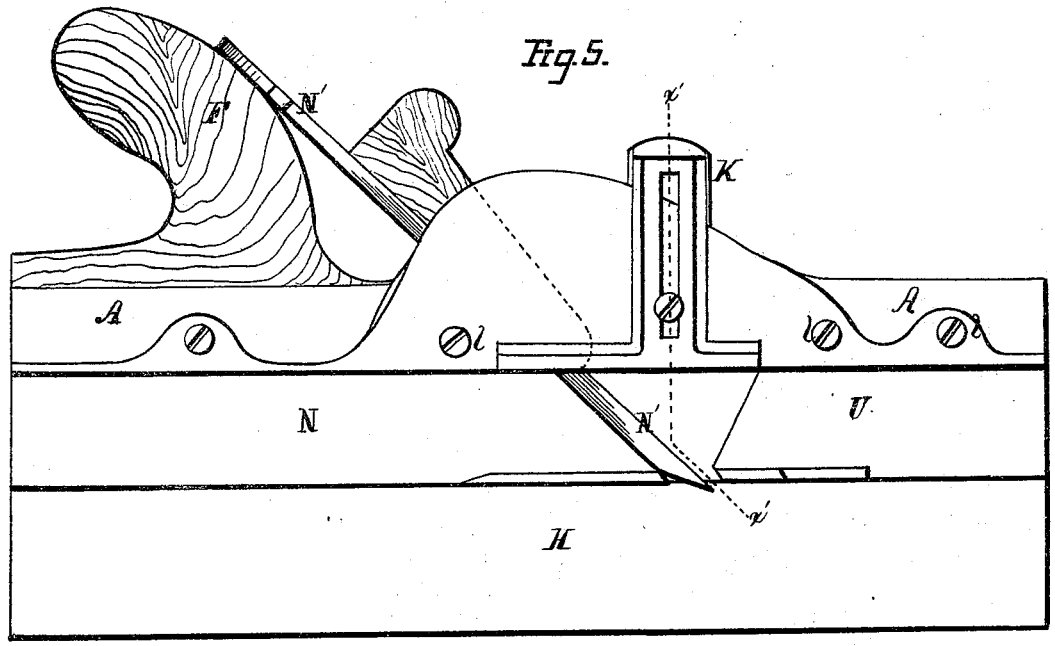
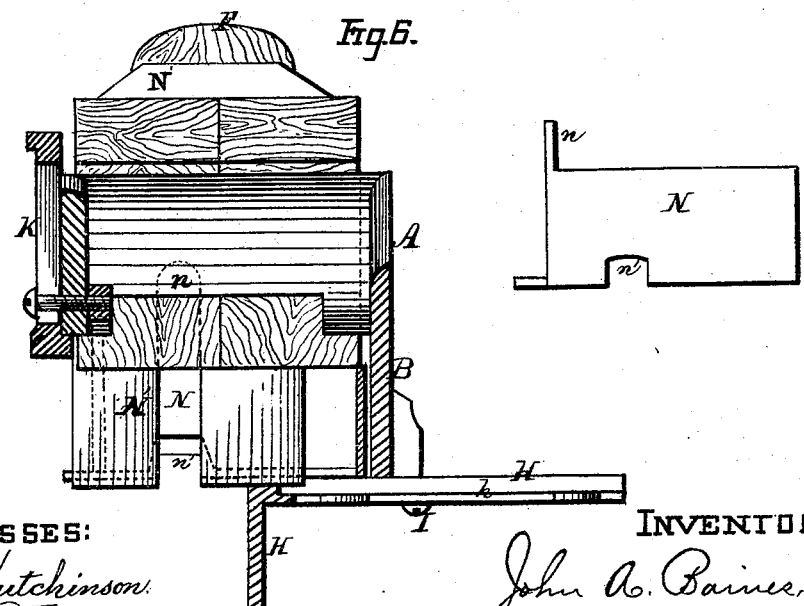
WITNESSES:
Jas. E. Hutchinson
John P. Young
INVENTOR.
John A. Baines, by
Prindle and Loy his Attys 6 Sheets--Sheet 4.

J. A. BAINES.
Metallic Planes.

No. 141,535. Patented August 5, 1873.

WITNESSES:
Jas. E. Hutchinson
John R. Young

INVENTOR.
John A. Baines, by
Prindle and by his Attys

J. A. BAINES.
Metallic Planes.

No. 141,535.

6 Sheets--Sheet 5.

Patented August 5, 1873.

Witnesses:
Jas. E. Hutchinson
John R. Young

Inventor.
John A. Baines, by
Prindle and Co. his Attys

J. A. BAINES.
Metallic Planes.

No. 141,535.

6 Sheets--Sheet 6.

Patented August 5, 1873.

WITNESSES:
Jas. E. Hutchinson
John R. Young

INVENTOR.
John A. Baines, by
Prindle and Co, his Attys

UNITED STATES PATENT OFFICE.

JOHN A. BAINES, OF NEW YORK, N. Y., ASSIGNOR OF ONE-HALF HIS RIGHT TO JAMES BARKER, OF SAME PLACE.

IMPROVEMENT IN METALLIC PLANES.

Specification forming part of Letters Patent No. 141,535, dated August 5, 1873; application filed July 2, 1873.

*To all whom it may concern:*

Be it known that I, JOHN A. BAINES, of New York, in the county of New York, and in the State of New York, have invented certain new and useful Improvements in Metallic Planes; and do hereby declare that the following is a full, clear, and exact description thereof, reference being had to the accompanying drawings making a part of this specification, in which—

Figure 1:
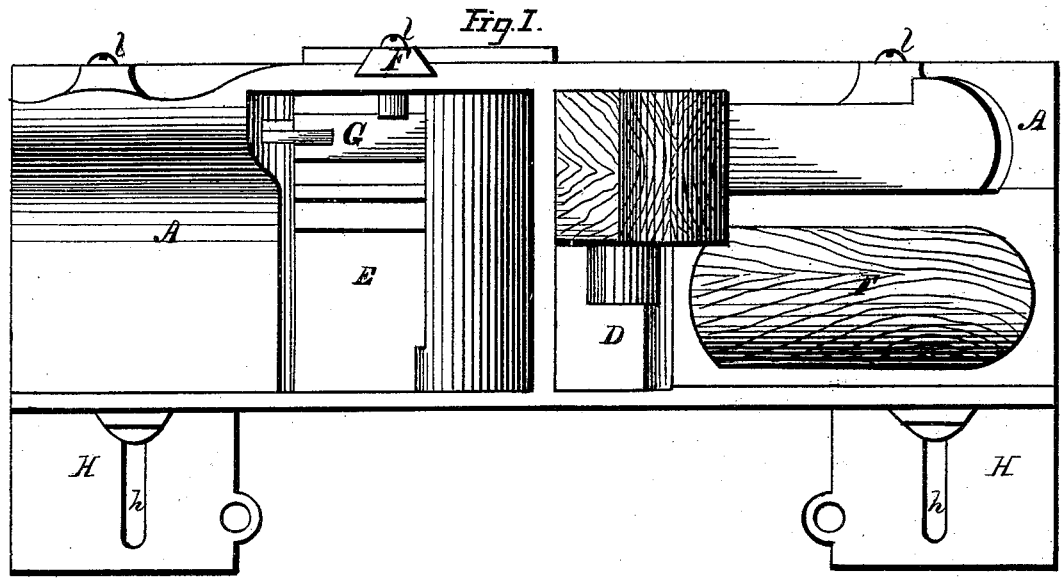
Figure 2:
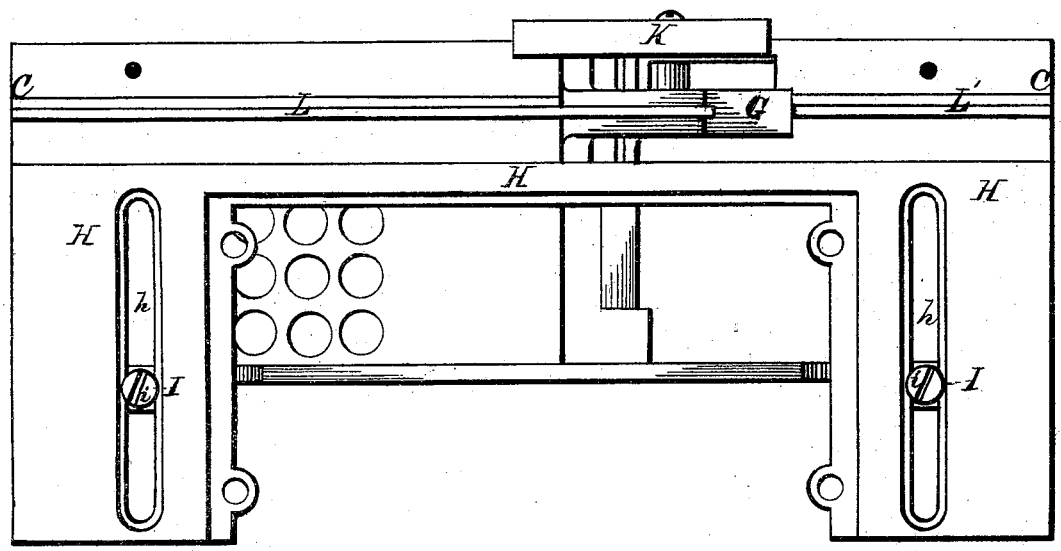
Figure 3:
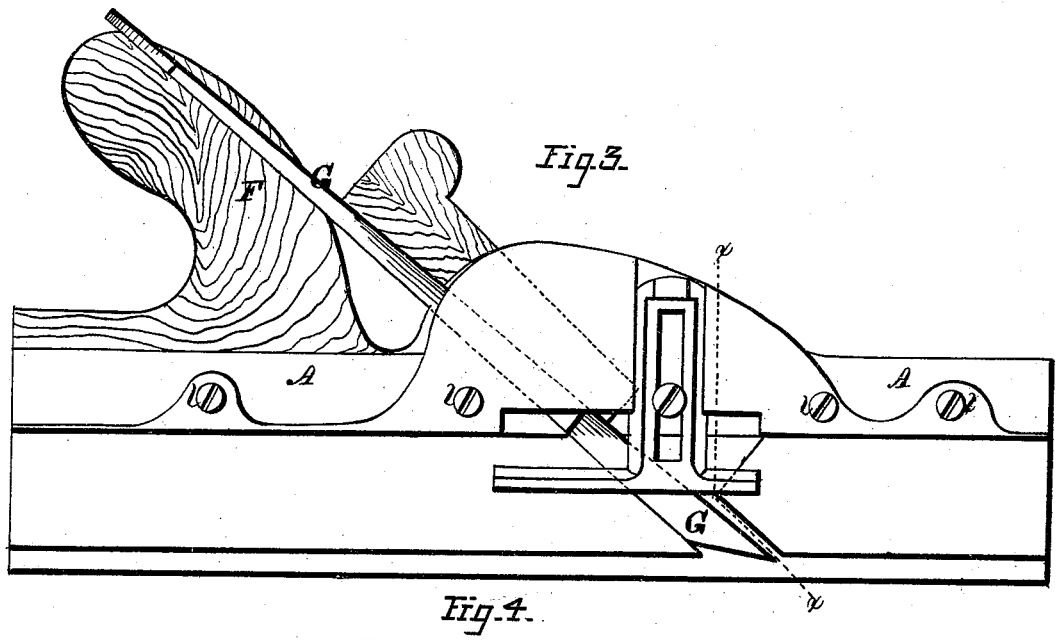
Figure 4:
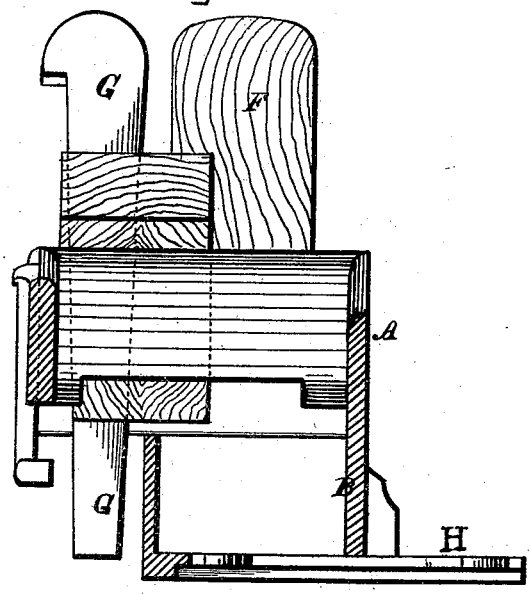
Figure 7:
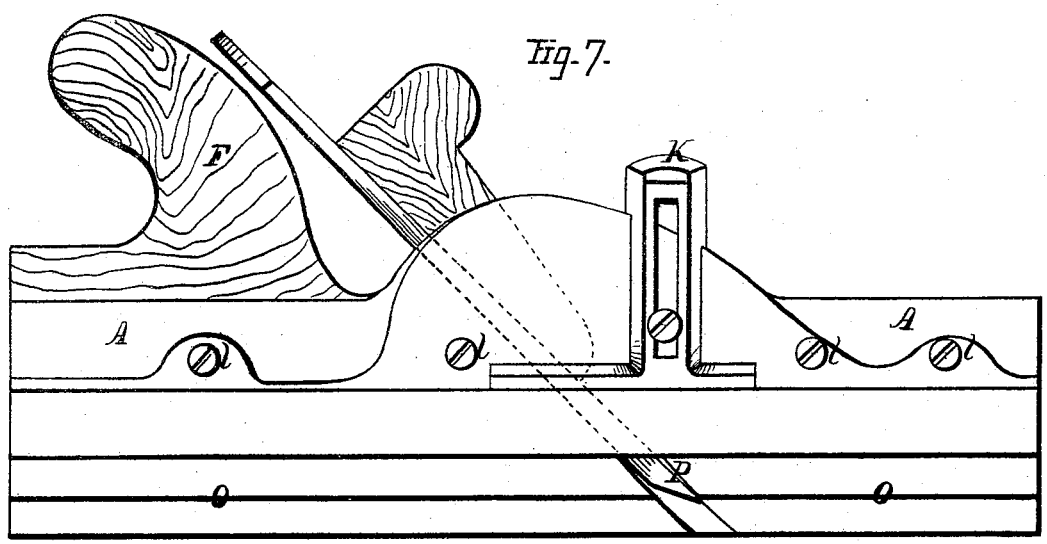
Figure 8:
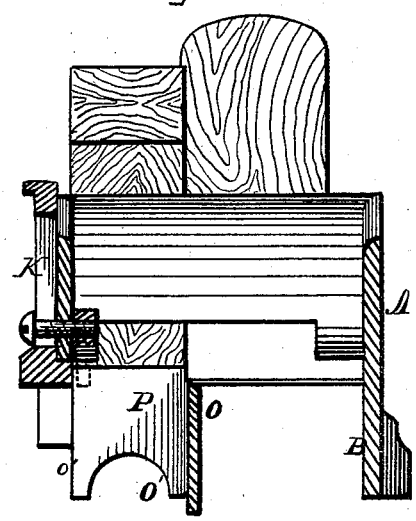
Figure 9:
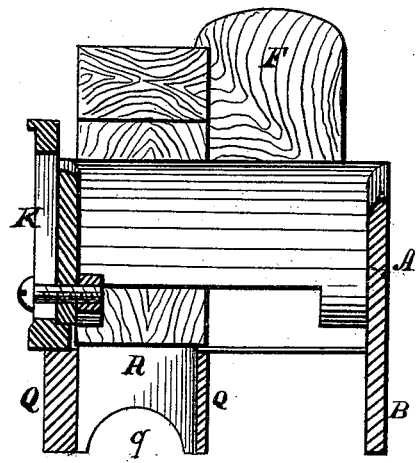
Figure 10:
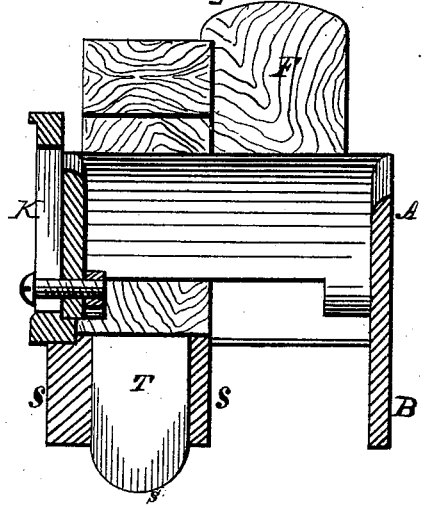
Figure 11:
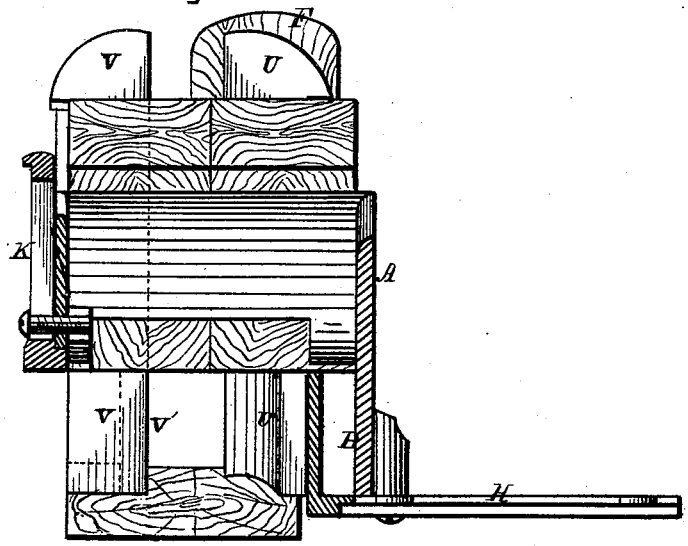
Figure 12:
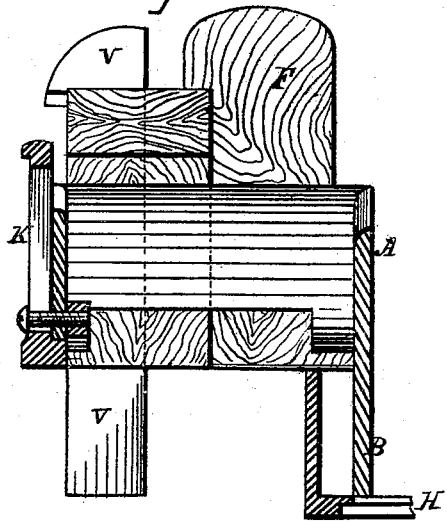
Figure 13:
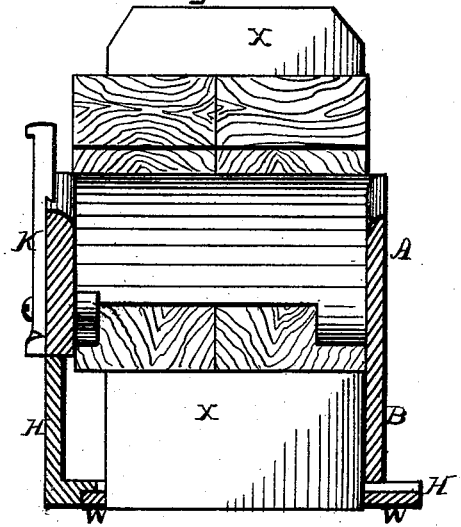

Figure 1 is a plan view of the upper side of my plane when arranged as a plow. Fig. 2 is a like view of the lower side of the same. Fig. 3 is a side elevation of said plow. Fig. 4 is a cross-section upon line $x\,x$ of Fig. 3. Fig. 5 is a side elevation of said plane when arranged for use in forming tongues and grooves. Fig. 6 is a cross-section upon line $x'\,x'$ of Fig. 5. Figs. 7 and 8 are like views of said device as arranged for use as a feeder. Figs. 9 and 10 are cross-sections of said plane when arranged for producing rounds and hollows. Fig. 11 is a cross-section, showing the arrangement of parts for forming the rails of a sash. Fig. 12 is a like view, showing the device arranged as a rabbet-plane; and Fig. 13 is a cross-section showing the arrangement of parts when used as a smoothing-plane.

Letters of like name and kind refer to like parts in each of the figures.

The design of my invention is to enable a number of planes employed in the production of irregular work to be combined with one common frame, so as thereby to lessen the expense and reduce the bulk of said articles; to which end said invention consists in the peculiar construction and combination of the frame and the various attachments employed for producing the different forms of plane required, substantially as and for the purpose hereinafter specified.

In the annexed drawings, A represents the main frame of the plane, the lower side of which has a plane surface, and is provided upon one side with a downward-projecting flange, B, and near its opposite side, within said lower surface, with a narrow groove, C. The sides of the frame near its longitudinal line are extended upward in a curve, as shown in Fig. 3, and between such extended portions are provided an inclined opening, D, for the reception of the cutters and fastening-wedges, and in front of the same a second opening, E, for the escape of shavings. A handle, F, of usual form, is secured upon and extends upward and rearward from the frame, and enables the device to be used in the ordinary manner.

The frame thus constructed furnishes the foundation for and upon which the attachments required for producing the various forms of plane are secured, as will be fully described hereinafter.

The combinations will be set forth in the order in which they are illustrated in the drawings, commencing with the plow, which is formed by inserting and securing the necessary tool G within one end of the opening D, and securing upon the lower side of the frame A an angle-plate, H, which, as seen in Figs. 2 and 4, extends vertically downward from the face of said frame to a point upon a line with the lower edges of the flange B, and thence horizontally outward beneath said flange, to which it is secured by means of two screws, I, that pass into the same through suitable transverse slots $h$ formed in said angle-plate. The slots $h$ are countersunk, so as to enable the screw-heads $i$ to be entirely within the surface of the angle-plate. By loosening the screws I, the angle-plate H, which operates as a gage, can be adjusted toward or from the tool G, so as to correspondingly vary the distance between the channel cut within a board and the edge of the same. A gage, K, attached to or upon the side of the frame A, opposite to the flange B, and made adjustable vertically, enables the depth of the channel cut by the tool G to be regulated at will. (See Fig. 6.)

For use as a grooving-plane, the angle-plate H is reversed, so as to cause its vertical portion to extend downward below the flange B, and two strips, L and L', are placed edgewise within the groove C, and secured in place by means of four screws, $l$, which latter pass horizontally inward through the side of the frame A, through said strips, and into the solid metal at the inner side of said groove. The rear strip L conforms in shape and position to the rear side of the cutting-tool M, and, bearing against the same, furnishes a support for said tool. As in the previous illustration, the angle-plate H furnishes an adjustable gage, by means of which the relative positions of the channel cut and the edge of the board being operated upon are determined.

For use as a tonguing-plane, the strips L are removed, and the block N provided with a rib or tongue, $n$, upon its upper side, (shown by dotted lines in Fig. 6,) is secured upon the lower side of the frame A' in place of said strips. A groove, $n'$, corresponding in size and depth to the tongue to be formed upon the edge of a board, is formed within the lower side of the block N, and a suitable tonguing-tool, N', employed in place of the grooving-tool M. The angle-plate H serves as an adjustable gage, as in the previous case.

For use as a beading-plane, the angle-plate H and strips L are removed, and a block, O, provided upon its upper side with a tongue, $o$, that corresponds in size and shape to the groove O secured in place of said strips. Within the lower side of the block O is provided a half-round groove, O', which corresponds in size and shape to the bead to be formed, while within its outer corner is formed a right-angled rabbet, $o'$, Fig. 8. The cutting-tool P corresponds in size and shape to the lower face of the block O, between the inner side of the rabbet $o'$ and the inner side of the groove O', and passes downward through an inclined opening formed in and through said block.

For use as a round plane, a block, Q, similar in general shape to the block O, but having within its lower face only a half-round groove, $q$, is secured in a like manner within the lower side of the frame A, and with it is employed a cutting-tool, R, which corresponds in size and shape to said groove, and passes to or into the same through an inclined opening in said block.

For the hollow plane, a block, S, similar to that just described, but provided upon its lower face with a half-round bead, $s$, is secured in or to the frame A, and a corresponding tool, T, employed in the manner shown.

When used as a sash-plane, the tool is arranged as in case of the plow, except that the angle-plate H is moved outward, so as to permit the beading-tool U to be inserted at a suitable distance from the right-angle tool V. When it is designed to form the meeting-rails of a sash, a narrow tool, V', shown by dotted lines, Fig. 11, is inserted in place of the tool V, and the channel for the reception of the edge of the glass cut by the same.

For use as a rabbet-plane, the arrangement of parts is precisely the same as in the preceding case, except that the beading-tool U is removed and the widest of the right-angle tools employed.

When used as a smoothing-plane, the angle-plate H is extended entirely across the lower face of the frame A, and the space in said plate (shown in Fig. 2) is inclosed by means of a corresponding plate, W, Fig. 13, through which is provided a transverse inclined slot for the passage of the plane-iron X. If desired, the space between the lower face of the frame A and the inner side of the angle-plate H can be closed immediately in front of the plane-iron by means of a detachable plate, so as to cause the shavings to pass upward through the opening in said frame, instead of passing forward between said frame and angle-plate.

The device thus constructed combines in a simple and compact form a number of tools which have heretofore been separate, and can be furnished at a cost not much exceeding that of two of such tools.

Having thus fully set forth the nature and and merits of my invention, what I claim as new is—

The hereinbefore-described plane, when constructed in the manner and for the purpose substantially as specified.

In testimony that I claim the foregoing I have hereunto set my hand this 26th day of June, 1873.

JOHN A. BAINES.

Witnesses:
 GEO. S. PRINDLE,
 EDM. F. BROWN.